United States Patent
Dietrich et al.

(10) Patent No.: US 11,339,082 B2
(45) Date of Patent: May 24, 2022

(54) GLASS WITH PREFERABLY INCREASED STORABLE TENSILE STRESS, CHEMICALLY TOUGHENED GLASS ARTICLE WITH PREFERABLY INCREASED STORABLE TENSILE STRESS, METHOD FOR PRODUCING SUCH GLASS, AND USE THEREOF

(71) Applicant: SCHOTT AG, Mainz (DE)

(72) Inventors: Rüdiger Dietrich, Jena (DE); Jochen Alkemper, Klein-Winternheim (DE); Oliver Hochrein, Mainz (DE); Susanne Krüger, Mainz (DE); Julia Weißhuhn, Mainz (DE)

(73) Assignee: SCHOTT AG, Mainz (DE)

( * ) Notice: Subject to any disclaimer, the term of this patent is extended or adjusted under 35 U.S.C. 154(b) by 223 days.

(21) Appl. No.: 16/596,512

(22) Filed: Oct. 8, 2019

(65) Prior Publication Data
US 2020/0109080 A1 Apr. 9, 2020

(30) Foreign Application Priority Data
Oct. 8, 2018 (DE) .................. 10 2018 124 785.0

(51) Int. Cl.
*C03C 3/097* (2006.01)
*C03C 3/087* (2006.01)
*C03C 3/093* (2006.01)

(52) U.S. Cl.
CPC ............. *C03C 3/097* (2013.01); *C03C 3/087* (2013.01); *C03C 3/093* (2013.01); *C03C 2203/24* (2013.01); *C03C 2203/50* (2013.01)

(58) Field of Classification Search
CPC ......... C03C 3/097; C03C 3/087; C03C 3/093; C03C 21/002
See application file for complete search history.

(56) References Cited

U.S. PATENT DOCUMENTS

| 4,055,703 A | 10/1977 | Rinehart |
| 4,156,755 A * | 5/1979 | Rinehart ............. C03C 3/083 428/410 |
| 8,075,999 B2 | 12/2011 | Barefoot |
| 8,312,739 B2 | 11/2012 | Lee |

(Continued)

FOREIGN PATENT DOCUMENTS

| DE | 112011100664 | 10/2015 |
| WO | 2012126394 | 9/2012 |

(Continued)

*Primary Examiner* — Noah S Wiese
(74) *Attorney, Agent, or Firm* — Ohlandt, Greeley, Ruggiero & Perle, L.L.P.

(57) ABSTRACT

Chemically toughened glass is provided that has a depth of compressive stress for potassium of at least 4 μm and at most 8 μm; a compressive stress at a depth of 30 μm due to sodium exchange of at most 200 MPa and a minimum amount of at least 90 MPa where the thickness is 0.5 mm, at least 100 MPa where the thickness is 0.55 mm, at least 110 MPa in where the thickness is 0.6 mm, at least 120 MPa where the thickness is 0.7 mm, and at least 140 MPa where the thickness is 1 mm; a ratio of sodium exchange depth, in μm, to the thickness, in mm, that is greater than 0.130; and a normalized integral of tensile stress that is a storable tensile stress of at least 20.6 MPa and at most 30 MPa.

20 Claims, 4 Drawing Sheets

(56) References Cited

U.S. PATENT DOCUMENTS

| | | | |
|---|---|---|---|
| 8,759,238 B2 | 6/2014 | Chapman | |
| 9,199,876 B2* | 12/2015 | Wang | C03B 23/0302 |
| 9,359,251 B2 | 6/2016 | Bookbinder | |
| 9,487,434 B2 | 11/2016 | Amin | |
| 9,540,278 B2 | 1/2017 | Chapman | |
| 9,593,042 B2 | 3/2017 | Hu | |
| 9,718,727 B2 | 8/2017 | Bookbinder | |
| 9,908,811 B2 | 3/2018 | Gross | |
| 9,908,812 B2 | 3/2018 | Jain | |
| 2012/0052271 A1 | 3/2012 | Gomez | |
| 2012/0321898 A1 | 12/2012 | Meinhardt | |
| 2013/0189486 A1 | 7/2013 | Wang | |
| 2014/0345325 A1 | 11/2014 | Allan | |
| 2015/0030834 A1 | 1/2015 | Morey | |
| 2015/0368148 A1 | 12/2015 | Duffy | |
| 2015/0368153 A1 | 12/2015 | Pesansky | |
| 2016/0002103 A1* | 1/2016 | Wang | C03B 17/06 428/141 |
| 2016/0122239 A1 | 5/2016 | Amin | |
| 2016/0122240 A1 | 5/2016 | Oram | |
| 2017/0295657 A1* | 10/2017 | Gross | H05K 5/0017 |
| 2017/0305789 A1* | 10/2017 | Fujii | C03C 21/002 |
| 2018/0057601 A1 | 3/2018 | Lowe | |

FOREIGN PATENT DOCUMENTS

| | | | |
|---|---|---|---|
| WO | WO-2016037589 A1 * | 3/2016 | ............. C03C 3/093 |
| WO | 2018152845 | 8/2018 | |
| WO | WO-2018152845 A1 * | 8/2018 | ............. C03C 3/083 |

* cited by examiner

GLASS WITH PREFERABLY INCREASED STORABLE TENSILE STRESS, CHEMICALLY TOUGHENED GLASS ARTICLE WITH PREFERABLY INCREASED STORABLE TENSILE STRESS, METHOD FOR PRODUCING SUCH GLASS, AND USE THEREOF

CROSS REFERENCE TO RELATED APPLICATIONS

This application claims benefit under 35 USC § 119 of German Application DE 10 2018 124 785.0 filed Oct. 8, 2018 the entire contents of which are incorporated herein by reference.

BACKGROUND

1. Field of the Invention

The present disclosure generally relates to glasses, in particular glasses that are capable of being toughened, in particular to chemically toughenable glasses, and also relates to glass articles comprising such a glass, for example by being made of such a glass or consisting of such a glass. The present disclosure in particular also relates to chemically toughenable and chemically toughened glass articles. Preferably, these glasses and glass articles are designed so as to be capable of storing therein a tensile stress that is increased compared to glasses and glass articles of the prior art. Furthermore, the present disclosure relates to a method for producing such a glass article and to the use thereof.

2. Description of Related Art

Toughened and toughenable glasses and/or glass articles are known. Such highly toughenable glasses have been developed to meet the requirements imposed on protective glasses for mobile devices, for example. These are usually aluminosilicate glasses which will also be referred to as AS glasses in the context of the present disclosure, or so-called lithium aluminosilicate glasses (also referred to as LAS glasses in the context of the present disclosure).

In other words, aluminosilicate glasses include silicon oxide $SiO_2$ and aluminum oxide $Al_2O_3$ as components, and also alkali oxides except for lithium oxide $Li_2O$, and lithium aluminosilicate glasses additionally include lithium oxide $Li_2O$. Therefore, one difference between the glasses referred to as "aluminosilicate glasses" and as "lithium aluminosilicate glasses" herein is that the lithium aluminosilicate glasses include $Li_2O$, but the aluminosilicate glasses do not. In addition to the aforementioned components, the glass usually includes further components.

SUMMARY

These glasses are designed so as to be capable of being chemically toughened. In the context of the present disclosure, a glass capable of being chemically toughened refers to a glass which is accessible to an ion exchange process. In such a process, ions of alkali metals are substituted in a surface layer of a glass article such as a glass sheet. This is done in such a way that a compressive stress zone is established in the surface layer, which is achieved by exchanging ions having smaller radii by ions having larger radii. For this purpose, the glass article is immersed in a so-called ion exchange bath, for example a molten salt, and the ion exchange bath includes the ions with the larger ionic radii, in particular potassium and/or sodium ions, so that the latter migrate into the surface layer of the glass article. In exchange, ions with lower ionic radii, in particular lithium and/or sodium ions, will migrate from the surface layer of the glass article into the ion exchange bath.

As a result, a compressive stress zone is formed, which can be described by the characteristic parameters of compressive stress, abbreviated CS, and depth of compressive stress, which is also referred to as "Depth of Layer", or abbreviated DoL. This depth of compressive stress, DoL, is well known to persons skilled in the art and, in the context of the present disclosure, denotes the depth at which the stress curve exhibits the stress zero crossing. Alternatively or additionally, this thickness DoL can be determined by a stress-optical zero-crossing measuring method, for example using measuring equipment with the trade names FSM-6000 or SLP 1000.

This measuring equipment can also be used to determine the surface compressive stress and the maximum compressive stress CS of a sheet or a sheet-like glass article for aluminosilicate glasses.

With highly toughenable glasses (only these are eligible as protective glasses for example for mobile devices with high demands on different strength requirements), high values of compressive stress (between 700 MPa and 1000 MPa) are usually achieved with depths of compressive stress between 40 µm and 200 µm. If an exchange of not just one ion occurs, but a combined exchange of potassium ions and sodium ions, for example, which is usually the case with LAS glasses, the parameters CS and DoL that characterize the compressive stress are often indicated for the respective components or ions, i.e., for example, the compressive stress resulting from the potassium exchange as "potassium CS", and the corresponding depth of compressive stress as "potassium DoL" or potassium depth of compressive stress.

Compared with the AS glasses, LAS glasses are advantageous in that they allow to faster achieve greater depths of compressive stress. The depth of compressive stress is given here as the value at which the stress curve has the value 0 MPa, so in the stress graph it is marked by the zero crossing of the stress curve. For LAS glasses, the depth of compressive stress is usually at least 100 µm or more, already for processing durations of 1 to 3 hours.

In fact, large depths of compressive stress of, for example, up to 125 µm or more are possible for AS glasses, too. However, a very high toughening temperature of 450° C. or more and/or very long toughening durations of 8 hours or more have to be selected to achieve such depths of compressive stress in these glasses. By contrast, LAS glasses offer the advantage that high values of compressive stress and depth of compressive stress can be achieved with significantly more favorable conditions, i.e. at lower temperatures and/or shorter exchange times.

The metrological determination of the values of compressive stress and depth of compressive stress is carried out using commercially available equipment, such as the FSM 6000 equipment for determining the compressive stress (potassium CS) and depth compressive stress (potassium DoL) achieved by the potassium exchange, and the SLP 1000 equipment, for example, for determining the characteristic stress values achieved with the sodium exchange, in particular the value of compressive stress achieved by sodium exchange at a depth of 30 µm (also abbreviated as "Na CS-30") and the depth of compressive stress achieved with sodium (sodium DoL). This devices are available from Orihara Ltd.

With glass articles toughened in this way, high mechanical strengths are achieved. However, what has to be considered regarding the strength of a product such as a glass article, is that the mechanical strength of a product not only depends on the material but in particular also on the type of loading. For example, prior art chemically toughened glass articles exhibit high flexural strength, for example as determined in a four-point bending test, or high impact strength, for example as determined in a so-called ball drop test, or high strength in case of a so-called "sharp impact". A very important test for mobile devices is the so-called set drop test, for example. This is a test which investigates loads on glass articles that can occur in real applications. For this purpose, a glass article is installed in the form as it would be installed in a later mobile device such as a smartphone, for example. Thus, a model of a terminal device is built, for example a model of a smartphone, in which the glass article is employed which is used as a display cover, for example. The weight of the model and the installation of the glass article largely corresponds to that of an actual terminal device, without however using respective components. Then, with the glass article facing downwards, the model is dropped down onto a surface which, for example, has particles with small radii of curvature. Such tests are thus intended to simulate real loads, for example when a smartphone falls on asphalt or tiled ground. It is generally known that rough ground, that is ground with pointed stones or sand grains protruding therefrom, is very critical for the integrity of a protective glass for mobile devices. For example, drop heights with the described glass-equipped dummies differ markedly when dropped onto smooth surfaces such as granite, or onto rough surfaces with sandpaper adhered thereon such as granite covered with sandpaper. In the case of rough ground as simulated by sandpaper-covered granite, drop heights are smaller than drop heights on smooth ground. Alternative tests that are used to investigate such "sharp impact" strengths include so-called "sandpaper ball drop tests", for example. U.S. patent application US 2015/0239775 A1 describes an exemplary set-up for a sandpaper ball drop test, for example.

BRIEF DESCRIPTION OF THE DRAWINGS

The invention will now be further explained with reference to drawings, wherein.

DETAILED DESCRIPTION

Figure 3:
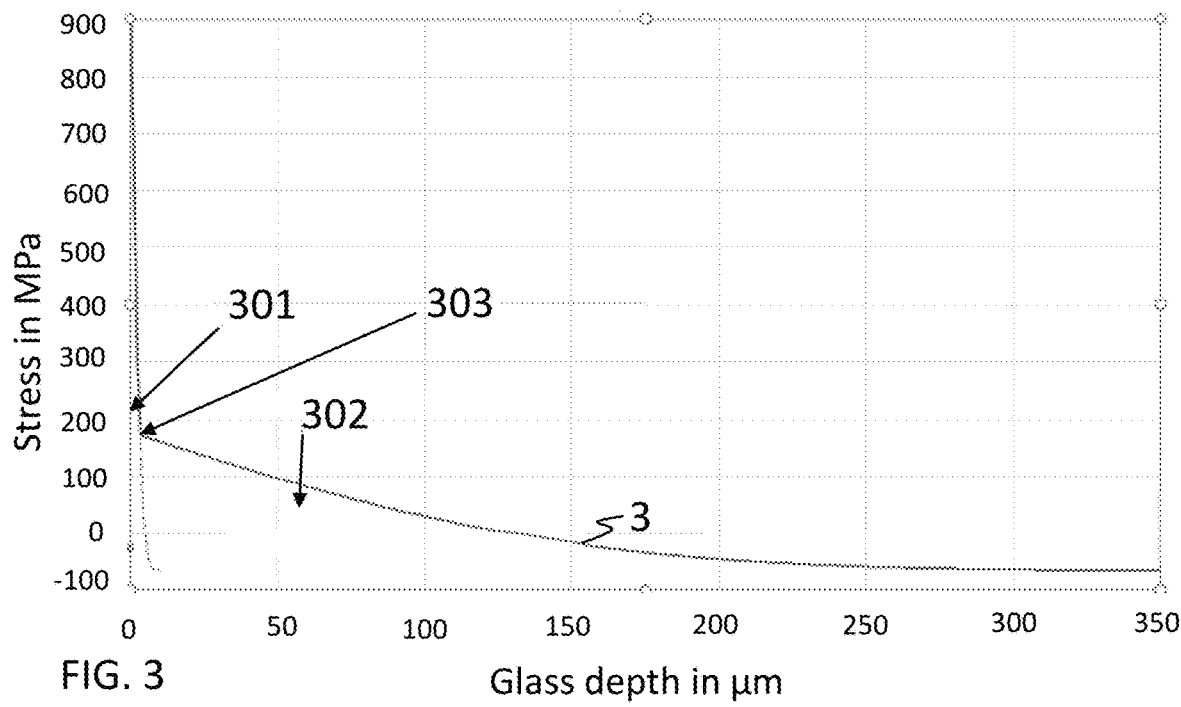
Figure 4:
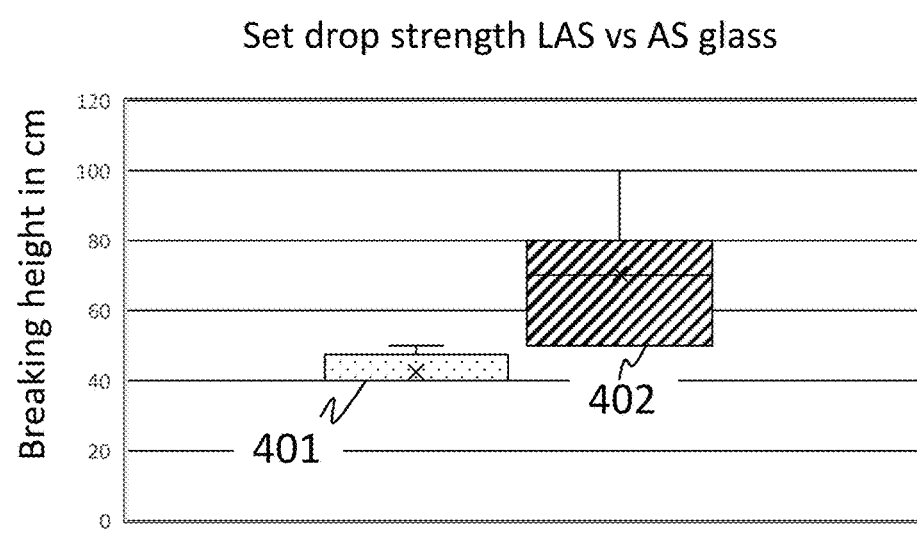
FIG. 4 shows the influence of the glass composition and the stress profile on the so-called set drop strength.

Although the toughening profiles of aluminosilicate glasses still achieve good to very good drop heights in set drop tests on smooth surfaces, the difference to LAS glasses becomes very clear in the set drop test on sandpaper. This is also seen in FIG. 4, for example. The compressive stress parameters of an aluminosilicate glass are shown in the enclosed FIG. 2, for example. Here, the common parameters of compressive stress, i.e. compressive stress CS and depth of compressive stress DoL, may practically be comparable to those of a LAS glass. An exemplary compressive stress profile for a toughened glass article comprising an LAS glass is shown in FIG. 3. This is a profile of compressive stress of an LAS glass according to the prior art. It can be seen from a comparison of FIGS. 2 and 3, there is a significant difference between these glass articles in the higher tensile stress stored in aluminosilicate glass. In FIG. 4 this fact is illustrated experimentally. The aluminosilicate glass with the significantly higher stored tensile stress exhibits significantly lower strength in the sandpaper set drop test, as illustrated by bar 401, i.e. in a so-called "sharp impact" strength test, than the LAS glass which exhibits a strength in the sandpaper set drop test as illustrated by bar 402.

It is state of the art that in addition to the conventional compressive stress parameters CS and DoL, tensile stress is also relevant for strength. In the case of excessively high compressive stress integrals—which accordingly also imply very large tensile stress integrals, since the compressive stress of a glass article introduced into the surface as a result of a toughening process is equal to the tensile stress resulting in the interior of the glass article—it has been found that the increase in strength may stagnate or even decline. This is because crack propagation is triggered more strongly, and glass breakage occurs earlier in strength tests, such as in a four-point bending test or a test that examines sharp impact strength, such as a set drop test. This is illustrated by the enclosed FIG. 4, for example, based on experimental data. Here, the aluminosilicate glass with the significantly higher stored tensile strength exhibits inferior strength in the sandpaper set drop test, i.e. in a sharp impact test. In this case, as already stated above, the other compressive stress parameters, i.e. CS and DOL, of the aluminosilicate glass article (see FIG. 2) are practically comparable to that of the LAS glass article according to FIG. 3. However, a significant difference exists with respect to the higher tensile stress stored in the aluminosilicate glass article, which is 60.7 MPa (see also comparative example 7 in Table 2). This is made possible by the composite or combined compressive stress profile of the LAS glass article, which is composed of the compressive stress components of the potassium and sodium ion exchanges.

Thus, with regard to the critical sharp-impact strength, glass articles with composite compressive stress profiles therefore have clear advantages over aluminosilicate glasses or glass articles, due to their significantly lower stored tensile stress with otherwise comparable CS and DoL values. Nevertheless, currently marketed LAS glasses or LAS glass articles with optimized toughening profiles do not exceed possible market-relevant drop heights of more than 1 meter on rough ground. Thus, there is further need for chemically toughened or chemically toughenable glass articles which exhibit further increased strength against sharp impact, for example for protective screens for mobile devices. However, with the glasses currently on the market and the employed post-processing procedures, further increases in the compressive stress parameters CS and DoL with at the same time comparatively low stored tensile stress cannot be expected. A further increase in CS and DoL, which would still be possible due to the low stored tensile stress, fails because the maximum of storable tensile stress has already been reached for the current LAS glasses. Current LAS glasses and the maximum stored tensile stress which can be achieved with them are shown in Table 2 as comparative examples (comp. ex.) 3 to 5, for example.

Thus, such loads are particularly critical in the case of AS glasses, since due to the ion exchange profile, a high compressive stress on the surface and a high depth of compressive stress always imply a high stored tensile stress here.

So-called LAS glasses in which the compressive stress or ion exchange profile resulting from the exchange is not only caused by sodium ions, but also by potassium ions, offer an advantage here. This is because in this case high compressive stress and a large depth of compressive stress can be achieved with at the same time a lower stored tensile stress compared to aluminosilicate glasses. For example, German Patent DE 10 2010 009 584 B4 describes two-stage ion exchange processes in which an exchange takes place in a sodium nitrate melt, for example over four hours at 390° C., followed by an exchange over 3 hour at 390° C. in a potassium nitrate melt. In this way, such composite compressive stress profiles are obtained.

In the case of LAS glasses, in which sodium and/or lithium ions are substituted by potassium and sodium ions this means, for example, that part of the compressive stress generated in the glass is due to the potassium exchange, and another part is due to the sodium exchange.

Early glass breakage which may occur especially in the case of a "sharp impact" load in highly toughened glass articles, is due to the fact that in such a load case, the damage of the glass article by the load caused by a very sharp particle penetrates through the compressive stress zone into the area of the glass article in which tensile stress is prevailing. As a result, glass breakage may occur, especially if the tensile stress stored in the glass article is very high.

Such failure caused by a sharp impact could be avoided by generating a very high compressive stress on the surface of the glass article, which then decreases sharply with increasing thickness of the glass article, combined with an overall high exchange depth.

This would be possible for LAS glasses, for example, if very high compressive stresses could be generated on the surface by the potassium exchange, but only a very low depth of compressive stress for potassium of only a few micrometers, and at the same time a high depth of compressive stress for sodium with at the same time only low compressive stress resulting from the sodium exchange, which can be characterized in particular by the so-called Na CS 30 value for the compressive stress generated.

However, it has been found that in the case of very low depths of compressive stress for potassium, in particular of less than 4 µm, and with only low Na CS-30 compressive stress values of less than 120 MPa, a low defect tolerance is resulting and the values obtained in the strength tests vary greatly and in particular include outliers downwards. If these limit values are strongly undershot, very low strength values are resulting overall, even in the so-called "blunt" failure cases, i.e. with loads caused by blunt items (as in a conventional ball drop test), as well as in static strength tests, such as in a strength determination according to the double-ring method or four-point bending test, for example.

Defect tolerance refers to the case in which the strength of glass articles is investigated, into which damage has been introduced previously. When the glass article exhibits low defect tolerance this is understood to mean that a very strong reduction in strength occurs already with a minor degree of preliminary damage. On the other hand, high defect tolerance means that even if preliminary damage has occurred, a high degree of strength is achieved. Preliminary damage herein refers to damage to the surface of the glass article, for example by sandblasting or treatment of the glass article with a rough surface. Since the strength of a glass article is substantially determined by the surface finish, preliminary damage to the surface of a glass article usually results in a significant decrease in strength.

There is thus a demand for glass articles which exhibit high mechanical strength to so-called "sharp impact" loads. Furthermore, there is a demand for glasses which exhibit high strength, preferably due to chemical toughening, in the case of a so-called "sharp impact".

The object of the invention is to provide glass articles and glasses which overcome or at least mitigate the aforementioned deficiencies of the prior art, and which in particular exhibit improved resistance against sharp impact loads compared with the prior art, for example. The invention furthermore relates to the use of such glass articles and to a method for producing same.

The object is achieved by the subject matter of the independent claims, preferred and specific embodiments are set forth in the dependent claims.

A first aspect of the present disclosure relates to a chemically toughened sheet-like glass article with a thickness between at least 0.4 mm and at most 3 mm, which has a depth of compressive stress for potassium of at least 4 µm and at most 8 µm, and a compressive stress at a depth of 30 µm due to sodium exchange of at least 90 MPa in the case of a thickness of the glass article of 0.5 mm, of at least 100 MPa in the case of a thickness of the glass article of 0.55 mm, of at least 110 MPa in the case of a thickness of the glass article of 0.6 mm, of at least 120 MPa in the case of a thickness of the glass article of 0.7 mm, and of at least 140 MPa in the case of a thickness of the glass article of 1 mm, and preferably of at most 200 MPa, wherein a ratio of sodium exchange depth, in µm, to the thickness of the glass article, in mm, is greater than 0.130; and which exhibits a storable tensile stress of at least 20.6 MPa and at most 30 MPa, preferably at most 27.5 MPa, more preferably at most 25 MPa, and most preferably at most 24 MPa. Here, storable tensile stress refers to the integral of tensile stress from a first main surface to the opposite main surface along a straight line in the normal direction, and this integral is divided by the integration length, that is the thickness of the substrate, in order to obtain a value that is comparable for substrates of different thicknesses. Thus, this integral of tensile stress normalized to the thickness has the dimension of a stress and provides comparable values for substrates of different thicknesses.

Such a glass article advantageously combines a high compressive stress and a large depth of compressive stress. The high depth of compressive stress ensures that only in the case of very deep damage of the glass article, i.e. for example in the case of very deep scratches or the like, the tensile stress area of the glass article will be reached. The glass article thus exhibits improved resistance to sharp impact loads. This high strength results from a storable tensile stress of at least 20.6 MPa.

However, it can be seen from the example of the aluminosilicate glasses (see Table 2, comparative example 7), the storable tensile stress should not be maximized, since still higher values of storable tensile stress would in turn again lead to a low resistance to sharp impact loads. A possible upper limit for the storable or stored tensile stress, which still results in good values in sharp impact tests, is 30 MPa. Preferably, the stored tensile stress should not exceed a value of 27.5 MPa, more preferably it should not amount to more than 25 MPa. In particular, a maximum value of the stored tensile stress of 24 MPa has presently been found to be particularly preferred.

The determination of stored tensile stress is achieved with a variation of approx. 5% to 10% around the determined value.

For the sake of simplicity, the tensile stress integral is calculated with the assumption of a linearly extending compressive stress profile. Accordingly, for an aluminosilicate glass, it is therefore resulting according to the following formula:

CS*DoL/2*1000*d;

wherein CS refers to the maximum compressive stress at the surface of the glass article, DoL is the depth of compressive stress, and d is the thickness of the glass article.

For an LAS glass with a composite compressive stress profile, the calculation is a little more complicated and is resulting according to the formula below.

[K CS*K DoL/2*1000+Na CS intersection point*
((Na DoL-K DoL)+(Na DoL-K DoL intersection point))/2*1000]/d.

Here, again, d denotes the thickness of the glass article. The "sodium CS intersection point" refers to the compressive stress at the point of the compressive stress profile at which the sodium compressive stress curve and the potassium compressive stress curve intersect. "Potassium DoL intersection point" refers to the depth in the glass article at the point of the compressive stress profile at which the sodium compressive stress curve and the potassium compressive stress curve intersect.

Figure 1:
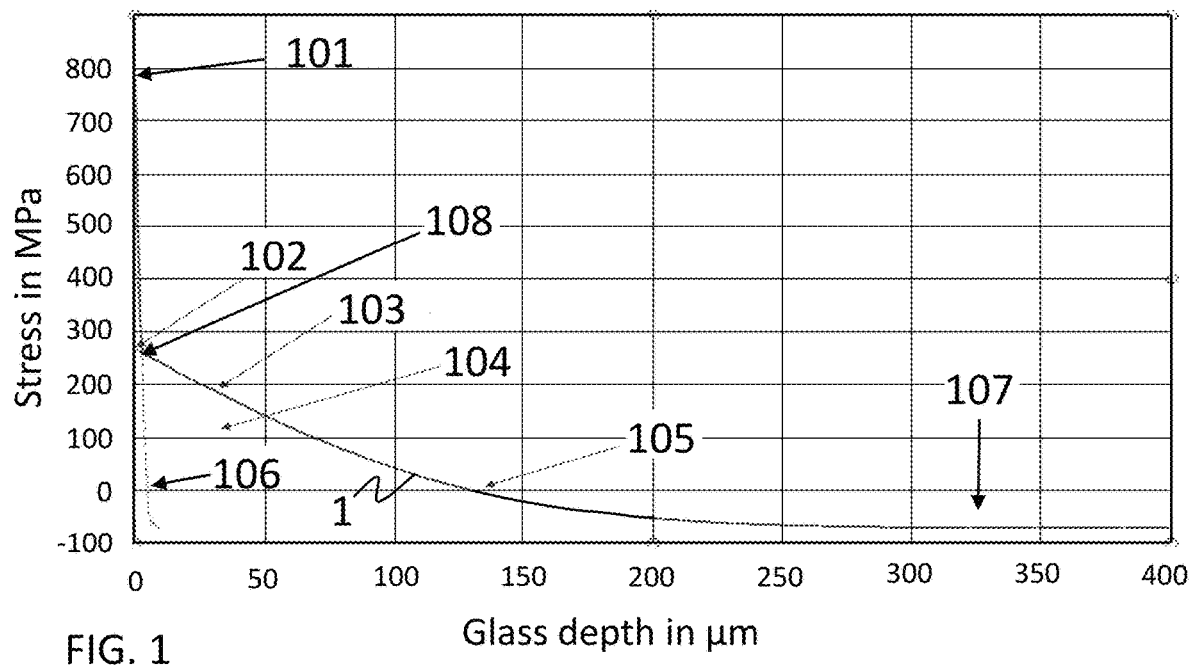
FIGS. 1 to 3 show stress profiles of glass articles according to the prior art.

In the accompanying figures, this point is indicated by reference numeral 108 in FIG. 1, and by reference numeral 303 in FIG. 3.

A second aspect of the present disclosure relates to a sheet-like glass article having a thickness between at least 0.4 mm and at most 3.0 mm; preferably to a chemically toughened or a chemically toughenable sheet-like glass article; particularly preferably to a sheet-like chemically toughened glass article having a depth of compressive stress for potassium of at least 4 μm and at most 8 μm, and a compressive stress at a depth of 30 μm due to sodium exchange of at least 90 MPa in the case of a thickness of the glass article of 0.5 mm, of at least 100 MPa in the case of a thickness of the glass article of 0.55 mm, of at least 110 MPa in the case of a thickness of the glass article of 0.6 mm, of at least 120 MPa in the case of a thickness of the glass article of 0.7 mm, and of at least 140 MPa in the case of a thickness of the glass article of 1 mm, and preferably of at most 200 MPa, wherein a ratio of sodium exchange depth, in μm, to the thickness of the glass article, in mm, is greater than 0.130; and exhibiting a storable tensile stress of at least 20.6 MPa and at most 30 MPa, preferably at most 27.5 MPa, more preferably at most 25 MPa, and most preferably at most 24 MPa; comprising the following components, in percent by weight:

$SiO_2$ 54 to 64, preferably 57 to 64, more preferably 60 to 62, and most preferably 61 to 62;
$Al_2O_3$ 16 to 28, preferably 16 to 21, more preferably 17.5 to 19.5, and most preferably 18 to 19;
$B_2O_3$ 0 to 0.6, preferably 0 to 0.45, more preferably 0 to 0.28, and most preferably 0 to 0.1;
$Li_2O$ 3.5 to 6.5, preferably 3.7 to 5.7, more preferably 3.9 to 5.5, yet more preferably 4 to 5.4, and most preferably 4.5 to 5.4;
$Na_2O$ 3 to 11.1, preferably 7.1 to 11.1, more preferably 7.5 to 10.7, and most preferably 7.8 to 10.5;
$K_2O$ 0 to 1.5, preferably 0.1 to 1.5, more preferably 0.2 to 1, and most preferably 0.3 to 0.75;
MgO 0 to 2, preferably 0 to 1.5, and most preferably 0 to 1;
CaO 0 to 0.55, preferably 0 to 0.5, more preferably 0 to 0.25, and most preferably 0 to 0.1;
ZnO 0 to 3, preferably 0 to 2, more preferably 0 to 1.5, and most preferably 0 to 1;
$P_2O_5$ 0.1 to 4.5, preferably 0.1 to 2, more preferably 0.25 to 1.75, and most preferably 0.5 to 1.5;
$ZrO_2$ 1 to 4.5, preferably 2.5 to 4.5, more preferably 2.8 to 4.2, and most preferably 2.9 to 4.1;
wherein the glass article preferably comprises up to 0.15 wt % of $CeO_2$, more preferably up to 0.1 wt % of $CeO_2$, and/or up to 0.1 wt % of $Fe_2O_3$, and wherein furthermore the glass article preferably includes SrO and BaO only in the form of unavoidable traces in a concentration of not more than 500 ppm; and with $0.8<[P_2O_5+(Na_2O*ZnO)]<12$.

A composition of a glass or of a glass article in the aforementioned composition ranges has a number of advantages.

It has in particular been found that a content of the glass or glass article of $Al_2O_3$ between 16 wt % and 28 wt % advantageously increases the toughenability of a glass or glass article. Preferably, the glass or glass article comprises between 16 wt % and 21 wt % of $Al_2O_3$, more preferably between 17.5 wt % and 19.5 wt %, and most preferably between 18 and 19 wt %.

$B_2O_3$ is a component that lowers the melting point in melts. The addition of $B_2O_3$ may also result in an advantageous increase in the scratch resistance of a glass or glass article. However, a high content of $B_2O_3$ has an adverse effect on the toughenability of a glass or glass article. The content of $B_2O_3$ is therefore limited in the glasses and glass articles according to the present disclosure. In particular, this content of the glasses or glass articles according to the present disclosure is at most 0.6 wt %, preferably at most 0.45 wt %, more preferably at most 0.28 wt %, and most preferably at most 0.1 wt %. It is also possible for glasses or glass articles according to the present disclosure to not include $B_2O_3$ at all, or to include $B_2O_3$ only in the form of unavoidable impurities in the glass or glass article.

$Li_2O$ is a necessary component of the glasses and glass articles of the present disclosure. The content of lithium oxide in the glasses and glass articles of the present disclosure in particular provides for a good strength of toughened glasses in static strength tests such as flexural strength according to the four point bending test or strength determined according to a double ring test, as well as against blunt impact loads, as the ball drop test, as well as good resistance to sharp impact loads, i.e. impacts on the surface of a glass or a glass article by particles exhibiting an angle of less than 100°. The glasses and glass articles according to the present disclosure therefore comprise at least 3.5 wt % of $Li_2O$, preferably at least 3.7 wt %, more preferably at least 3.9 wt %, yet more preferably at least 4 wt %, and most preferably at least 4.5 wt %. However, the $Li_2O$ content is limited according to the present disclosure. Excessive levels of $Li_2O$ may result in segregation, for example. The glasses and glass articles therefore comprise at most 6.5 wt % of $Li_2O$, preferably at most 5.7 wt %, more preferably at most 5.5 wt %, and most preferably at most 5.4 wt %.

Furthermore, the glasses and glass articles of the present disclosure comprise sodium oxide, $Na_2O$. The glasses of the present disclosure comprise at least 3 wt % of $Na_2O$, preferably at least 7.1 wt % of $Na_2O$, more preferably at least 7.5 wt % of $Na_2O$, and most preferably at least 7.8 wt % of Na$_2$O. According to the present disclosure, the content of Na$_2$O is also limited. The glasses and glass articles of the present disclosure comprise at most 11.1 wt % of Na$_2$O, preferably at most 10.7 wt %, and most preferably at most 10.5 wt %.

The glasses and glassware include K$_2$O as an optional component. However, for adjusting an optimized strength of a glass or a glass article, in particular an optimized sharp impact strength and at the same time a good strength in static strength tests such as flexural strength and to blunt impact loads, it may however be advantageous for the glass to include a certain amount of K$_2$O. It has in particular been found that the ion exchange and therefore the toughenability can be improved by K$_2$O. This is attributed to the glass structure becoming loosened up by the potassium ions. Preferably, the glass or glass article according to the present disclosure comprises at least 0.1 wt % of K$_2$O, more preferably at least 0.2 wt %, and most preferably at least 0.3 wt %. The content of K$_2$O is, however, limited since it does not participate in ion exchange. The glasses according to the present disclosure therefore comprise at most 1.5 wt % of K$_2$O, more preferably at most 1 wt %, and most preferably at most 0.75 wt %.

MgO is a further optional component of the glasses or glass articles according to the present disclosure. Magnesium reduces the viscosity of the melt and also has an impact on ion exchange. The content of MgO in the glasses and glass articles is limited and is at most 2 wt %, preferably at most 1.5 wt %, and most preferably at most 1 wt %.

Furthermore, the glasses or glass articles according to the present disclosure may contain at most 0.55 wt % of CaO, preferably at most 0.5 wt %, more preferably at most 0.25 wt %, and most preferably at most 0.1 wt %. SrO may also be contained in the glass or glass article of the present disclosure, with a content of up to 3 wt %.

Another optional component of the glass or glass article of the present disclosure is ZnO. The glasses or glass articles according to the present disclosure comprise at most 3 wt % of ZnO, preferably at most 2 wt % of ZnO, more preferably at most 1.5 wt % of ZnO, and most preferably at most 1 wt % of ZnO.

The glass or glass article of the present disclosure includes at least 0.1 wt % of P$_2$O$_5$. P$_2$O$_5$ is a component that facilitates ion exchange, so that it leads or may lead to shorter process times. The content in the glass or glass article is preferably 0.25 wt % and more preferably at least 0.5 wt %. However, an excessive content of P$_2$O$_5$ in a glass or glass article may reduce the chemical stability of the glass or glass article, or the P$_2$O$_5$ may cause segregation phenomena. Therefore, the glass or glass article of the present disclosure comprises at most 4.5 wt % of P$_2$O$_5$, preferably at most 2 wt %, more preferably at most 1.75 wt %, and most preferably at most 1.5 wt %.

Another component of glasses and glass articles according to the present disclosure is ZrO$_2$. ZrO$_2$ is effective as a network former in the glasses and glass articles of the present disclosure and advantageously increases the chemical resistance of the glass or glass article and its hardness. Glasses and glass articles of the present disclosure therefore comprise at least 1 wt % of ZrO$_2$, preferably at least 2.5 wt %, more preferably at least 2.8 wt %, and most preferably at least 2.9 wt %. Furthermore, the glasses and glass articles according to the present disclosure comprise at most 4.5 wt % of ZrO$_2$, preferably at most 4.2 wt %, and more preferably at most 4.1 wt %.

Furthermore, the glass article or glass of the present disclosure preferably comprises up to 0.15 wt % of CeO$_2$, preferably up to 0.1 wt % of CeO$_2$, and/or up to 0.1 wt % of Fe$_2$O$_3$. CeO$_2$ may be added as a refining agent, for example. Also, CeO$_2$ increases the UV stability of glasses and glass articles in an advantageous manner.

Furthermore, preferably, the glass article or the glass of the present disclosure includes SrO and BaO only in the form of unavoidable traces, in a concentration of 500 ppm or less.

Furthermore, the ratio of the alkali oxides and alkaline earth oxides contained in the glass or glass article is important. They expand the network and thus allow to rapidly achieve high toughening. P$_2$O$_5$ is also decisive in this respect. The inventors have found that this interaction can be expressed by the content (in wt % in each case) of the glass or of a glass article of Na$_2$O (for the alkali oxides), of ZnO (which assumes the function of an alkaline earth oxide here), and of P$_2$O$_5$, namely by [P$_2$O$_5$+(Na$_2$O*ZnO)].

This value should be greater than 0.8, but less than 12. Surprisingly, it has been found that only with a composition in this composition range and by complying with this condition it is possible to achieve an appropriate stored tensile stress, i.e. good strength to sharp impact loads.

Yet another aspect of the present disclosure relates to a chemically toughened sheet-like glass article having a thickness between at least 0.4 mm and at most 3 mm, preferably a glass article according to the first and/or second aspects of the present disclosure, which is produced by a two-stage ion exchange of a lithium aluminosilicate glass, wherein a first ion exchange is performed over a duration of 1.5 hours to 4 hours at a temperature between 380° C. and less than at most 400° C., in particular at most 395° C., and with a composition of the exchange bath between at least 40 wt % and at most less than 70 wt % of potassium salt, in particular KNO$_3$, and at most 60 wt % to at least more than 30 wt % of sodium salt, in particular NaNO$_3$; and a second ion exchange is performed over a duration of 2.5 hours to 5 hours at a temperature between 360° C. and 390° C. and with a composition of the exchange bath of between 90 wt % and 95 wt % of potassium salt, in particular KNO$_3$, and 10 wt % to 5 wt % of sodium salt, in particular NaNO$_3$.

By manufacturing a toughened glass article as stated above it is possible to produce a glass article of high strength in a particularly rapid manner.

In particular it is possible in this way to produce a glass article which exhibits high strength under sharp impact loads.

In the context of the present disclosure, the following terms and definitions shall apply:

An exchange bath is understood to mean a salt melt, which salt melt is used in an ion exchange process for a glass or a glass article. In the context of the present disclosure, the terms of exchange bath and ion exchange bath are used synonymously.

Usually, salts of technical purity are used for exchange baths. This means that despite the use of, for example, only sodium nitrate as the starting material for an exchange bath, the exchange bath will still include certain impurities. The exchange bath is a melt of a salt, for example of sodium nitrate, or of a mixture of salts, for example a mixture of a sodium salt and a potassium salt. Here, the composition of the exchange bath is specified to refer to the nominal composition of the exchange bath without consideration of any impurities that might be included. Therefore, if a 100% sodium nitrate melt is mentioned in the context of the present disclosure, this means that only sodium nitrate was used as the raw material. However, the actual content of sodium nitrate in the exchange bath may and usually will deviate from this, in particular since technical raw materials include a certain content of impurities. However, it will usually amount to less than 5 wt %, in particular less than 1 wt %, based on the total weight of the exchange bath.

Similarly, in the case of exchange baths which comprise a mixture of different salts, the nominal contents of these salts are given without consideration of technically related impurities of the starting materials. So, an exchange bath containing 90 wt % of $KNO_3$ and 10 wt % of $NaNO_3$ might therefore also have a few impurities which, however, are due to the raw materials and should generally be less than 5 wt %, in particular less than 1 wt %, based on the total weight of the exchange bath.

Furthermore, the composition of the exchange bath also changes in the course of the ion exchange, since in particular lithium ions will migrate from the glass or the glass article into the exchange bath as a result of the continued ion exchange. However, unless expressly stated otherwise, such an alteration of the composition of the exchange bath due to aging is likewise not taken into account here. Rather, the composition of an exchange bath will be specified based on the nominal original composition in the context of the present disclosure.

In the context of the present disclosure, a stress profile is understood to mean a graph of stress versus thickness extension of the glass article under consideration of a glass article such as a glass sheet. If, in the context of the present disclosure, a compressive stress profile is mentioned, this is understood to mean that part of a stress profile in which the stress assumes positive values, i.e. is greater than zero. By contrast, tensile stress has a negative sign.

In the context of the present disclosure, a composite compressive stress profile is understood to mean a compressive stress profile in which the compressive stress generated in the respective article such as a glass article, is composed of at least two partial regions.

The compressive stress stored in a toughened glass article results from integrating the compressive stress across the thickness of the glass article. This integral is referred to as compressive stress integral in the context of the present disclosure.

The tensile stress stored in a toughened glass article results as a mean value of the integrated tensile stress over the total thickness of the glass article. This integral is referred to as tensile stress integral in the context of the present disclosure. Therefore, in the context of the present disclosure, storable tensile stress is understood to mean the normalized tensile stress or, synonymously, normalized tensile stress integral, that is the tensile stress integral normalized to the thickness, and is always specified as an absolute value (positive value).

In the context of the present disclosure, storable tensile stress is interchangeable with the terms of normalized (or thickness-based) tensile stress and normalized (or thickness-based) tensile stress integral.

In the context of the present disclosure, a sheet-like glass article is understood to mean a glass article which has a lateral dimension in one spatial direction that is at least an order of magnitude smaller than in the other two spatial directions, these spatial directions being given with respect to a Cartesian coordinate system in which these spatial directions extend perpendicular to each other and the thickness is measured in the direction of the surface normal of the largest or main surface, between one main surface and the other main surface.

Since the thickness is at least an order of magnitude smaller than the width and length of the glass article, width and length thereof may be of the same order of magnitude. However, it is also possible that the length is significantly larger than the width of the glass article. Sheet-like glass articles in the sense of the present disclosure may therefore also comprise a glass ribbon.

For the purposes of the present disclosure, glass is understood to mean a material, and a glass article is understood to mean a product made from the material glass and/or comprising the material glass. In particular, a glass article may consist of glass or comprise the material glass predominantly i.e. at least 90 wt %.

In the context of the present disclosure, chemical toughening is understood to mean a process in which a glass article is immersed in a so-called exchange bath. This leads to the exchange of ions. For the purposes of the present disclosure, potassium exchange is understood to mean that potassium ions migrate from the exchange bath into the glass article, in particular into the surface of the glass article, to be incorporated there, for example, while small alkali ions such as sodium, for example, will migrate from the glass article into the exchange bath. Similarly, sodium exchange is understood to mean that sodium ions from the exchange bath migrate into the surface of the glass article, while small ions such as lithium ions will migrate from the glass article, in particular from the surface of the glass article into the exchange bath. As already described above, this ion exchange results in the formation of a compressive stress zone in the surface region of the glass article.

For the purposes of the present disclosure, maximum tensile stress is understood to mean the lowest stress value in the stress profile of a glass article.

In the context of the present disclosure, a so-called "sharp impact" is understood to mean a load in which the damage is produced by a small pointed item or by a multiplicity of such small pointed items. In other words, this refers to an impact by or on one or more pointed items, i.e. for example particles having very small radii of curvature or in which the angle of the pointed tip is less than 100°.

According to one embodiment of the disclosure, the glass article exhibits a maximum tensile stress between 55 MPa and 85 MPa. Such an embodiment of the glass article is advantageous because in this way, an improvement is achieved in particular in the strength under blunt impact loads, that is to say in particular an improvement in the so-called ball drop strength. Therefore, a particularly good strength in all relevant load cases can be attributed to the glass article according to this embodiment. This has not been feasible so far. In particular it was not possible so far to achieve good strength against sharp impact loads and at the same time a high maximum tensile stress, which is also referred to as center tension or central tension, for example, abbreviated CT. The now achievable maximum tensile stresses of between 55 MPa and 85 MPa are higher by about 10% to 15% than those of glasses or glass articles currently on the market.

Preferably, the thickness of the glass article is at least 0.5 mm. Such minimum thicknesses are advantageous because at lower thicknesses the glass article as a whole will already be very fragile.

However, small thicknesses of glass articles are advantageous because in this way the glass articles have a low weight. This is particularly advantageous for applications of the glass article as a display cover in a mobile device such as a smartphone.

According to a further embodiment of the glass article, the thickness of the glass article is at most 2 mm, preferably at most 1 mm. Such a configuration is advantageous because a glass article will be more stable to mechanical impact the thicker it is. Thicker glass articles therefore inherently provide higher mechanical stability. However, this results in an increase in weight. Advantageously, the glass article should therefore have a thickness of not more than 2 mm, in particular not more than 1 mm.

Yet another aspect of the present disclosure relates to the use of a glass article according to embodiments of the present disclosure. The disclosure therefore relates to the use of the glass article according to embodiments as a cover sheet, in particular as a cover sheet in consumer electronics, or as protective glazing, in particular as protective glazing for machinery, or as glazing in high-speed trains, or as safety glazing, or as automotive glazing, or in diving watches, or in submarines, or as a cover sheet for explosion-proof equipment, in particular for those in which the use of glass is mandatory.

According to yet another aspect, the present disclosure relates to a glass comprising the following components, in percent by weight:

$SiO_2$ 54 to 64, preferably 57 to 64, more preferably 60 to 62, and most preferably 61 to 62;
$Al_2O_3$ 16 to 28, preferably 16 to 21, more preferably 17.5 to 19.5, and most preferably 18 to 19;
$B_2O_3$ 0 to 0.6, preferably 0 to 0.45, more preferably 0 to 0.28, and most preferably 0 to 0.1;
$Li_2O$ 3.5 to 6.5, preferably 3.7 to 5.7, more preferably 3.9 to 5.5, yet more preferably 4 to 5.4, and most preferably 4.5 to 5.4;
$Na_2O$ 3 to 11.1, preferably 7.1 to 11.1, more preferably 7.5 to 10.7, and most preferably 7.8 to 10.5;
$K_2O$ 0 to 1.5, preferably 0.1 to 1.5, more preferably 0.2 to 1, and most preferably 0.3 to 0.75;
MgO 0 to 2, preferably 0 to 1.5, and most preferably 0 to 1;
CaO 0 to 0.55, preferably 0 to 0.5, more preferably 0 to 0.25, and most preferably 0 to 0.1;
ZnO 0 to 3, preferably 0 to 2, more preferably 0 to 1.5, and most preferably 0 to 1;
$P_2O_5$ 0.1 to 4.5, preferably 0.1 to 2, more preferably 0.25 to 1.75, and most preferably 0.5 to 1.5;
$ZrO_2$ 1 to 4.5, preferably 2.5 to 4.5, more preferably 2.8 to 4.2, and most preferably 2.9 to 4.1.

The glass and/or the glass article made of this glass preferably comprises up to 0.15 wt % of $CeO_2$, more preferably up to 0.1 wt % of $CeO_2$, and/or up to 0.1 wt % of $Fe_2O_3$, and wherein furthermore the glass preferably includes SrO and BaO only in the form of unavoidable traces in a concentration of not more than 500 ppm; and with $0.8 < [P_2O_5 + (Na_2O*ZnO)] < 12$.

Furthermore, according to yet another aspect, the present disclosure also relates to a method for producing a glass article according to embodiments of the disclosure, comprising: a first ion exchange over a duration of 1.5 hours to 4 hours at a temperature between 380° C. and less than at most 400° C. and with a composition of the exchange bath of between at least 40 wt % and at most less than 70 wt % of potassium salt, in particular $KNO_3$, and at most 60 wt % to at least more than 30 wt % of sodium salt, in particular $NaNO_3$; and a second ion exchange over a duration of 2.5 hours to 5 hours at a temperature between 360° C. and 390° C. and with a composition of the exchange bath of between 90 wt % and 95 wt % of potassium salt, in particular $KNO_3$, and 10 wt % to 5 wt % of sodium salt, in particular $NaNO_3$.

Examples

The invention will now be explained in more detail by way of examples.

According to one embodiment, the glass or glass article according to the present disclosure comprises the following components (in wt %):

| | |
|---|---|
| $SiO_2$ | 54 to 64 |
| $Al_2O_3$ | 16 to 28 |
| $B_2O_3$ | 0 to 0.6 |
| $Li_2O$ | 3.5 to 6.5 |
| $Na_2O$ | 3 to 11.1 |
| $K_2O$ | 0 to 1.5 |
| MgO | 0 to 2 |
| CaO | 0 to 0.55 |
| ZnO | 0 to 3, preferably 0 to 2, more preferably 0 to 1.5, and most preferably 0 to 1 |
| $P_2O_5$ | 0.1 to 4.5 |
| $ZrO_2$ | 1 to 4.5, and with $0.8 < [P_2O_5 + (Na_2O * ZnO)] < 12$. |

According to a further embodiment of the glass or glass article, the glass or glass article according to the present disclosure comprises the following components (in wt %):

| | |
|---|---|
| $SiO_2$ | 57 to 64 |
| $Al_2O_3$ | 16 to 21 |
| $B_2O_3$ | 0 to 0.45 |
| $Li_2O$ | 3.7 to 5.7 |
| $Na_2O$ | 7.1 to 11.1 |
| $K_2O$ | 0.1 to 1.5 |
| MgO | 0 to 2 |
| CaO | 0 to 0.5 |
| ZnO | 0 to 2 |
| $P_2O_5$ | 0.1 to 2 |
| $ZrO_2$ | 2.5 to 4.5, and with $0.8 < [P_2O_5 + (Na_2O * ZnO)] < 12$. |

According to a further embodiment of the glass or the glass article, the glass or the glass article comprises the following components (in wt %):

| | |
|---|---|
| $SiO_2$ | 60 to 62 |
| $Al_2O_3$ | 17.5 to 19.5 |
| $B_2O_3$ | 0 to 0.28 |
| $Li_2O$ | 3.9 to 5.5 |
| $Na_2O$ | 7.5 to 10.7 |
| $K_2O$ | 0.2 to 1 |
| MgO | 0 to 1.5 |
| CaO | 0 to 0.25 |
| ZnO | 0 to 1.5 |
| $P_2O_5$ | 0.25 to 1.75 |
| $ZrO_2$ | 2.8 to 4.2, and with $0.8 < [P_2O_5 + (Na_2O * ZnO)] < 12$. |

According to a further embodiment of the glass or the glass article, the glass or the glass article comprises the following components (in wt %):

| | |
|---|---|
| $SiO_2$ | 61 to 62 |
| $Al_2O_3$ | 18 to 19 |
| $B_2O_3$ | 0 to 0.1 |
| $Li_2O$ | 4 to 5.4 |
| $Na_2O$ | 7.8 to 10.5 |
| $K_2O$ | 0 to 1, preferably 0.3 to 0.75 |
| MgO | 0 to 1 |
| CaO | 0 to 0.1 |
| ZnO | 0 to 1 |
| $P_2O_5$ | 0.5 to 1.5 |

-continued

| | |
|---|---|
| ZrO$_2$ | 2.9 to 4.1, and |
| | with 0.8 < [P$_2$O$_5$ + (Na$_2$O * ZnO)] < 12. |

The glass or the glass article may furthermore comprise up to 0.15 wt %, preferably up to 0.1 wt % of CeO$_2$, and/or up to 0.1 wt % of Fe$_2$O$_3$. Preferably, the glass comprises BaO and/or SrO only in the form of unavoidable traces in a content of not more than 500 ppm each.

Table 1 below lists some examples of toughened glass articles. In particular, exemplary embodiments according to the present disclosure are compared with comparative examples (abbreviated Comp. ex.).

TABLE 1

Preliminary stress values of different toughened glass articles comprising LAS glasses of different compositions

| | K CS (MPa) | K DoL (μm) | Na CS-30 (MPa) | Na CS (MPa) | Na DoL (μm) | Stored tensile stress (MPa) |
|---|---|---|---|---|---|---|
| Example 1 | 735 | 5.7 | 180 | 233 | 118 | 21.87 |
| Comp. ex. 1 | 702 | 6.5 | 160 | 204 | 122 | 20.24 |
| Comp. ex. 2 | 713 | 6.8 | 155 | 197 | 125 | 20.20 |
| Example 2 | 721 | 7.0 | 165 | 208 | 123 | 21.03 |
| Example 3 | 723 | 6.9 | 153 | 191 | 131 | 20.60 |
| Example 4 | 729 | 6.9 | 157 | 196 | 130 | 20.99 |

TABLE 1-continued

Preliminary stress values of different toughened glass articles comprising LAS glasses of different compositions

| | K CS (MPa) | K DoL (μm) | Na CS-30 (MPa) | Na CS (MPa) | Na DoL (μm) | Stored tensile stress (MPa) |
|---|---|---|---|---|---|---|
| Example 5 | 736 | 6.9 | 165 | 205 | 132 | 22.13 |
| Example 6 | 755 | 7.1 | 170 | 210 | 138 | 23.58 |

Table 2 shows another comparison of toughened glass articles with an optimized toughened glass article according to the present disclosure.

TABLE 2

Preliminary stress values of different toughened glass articles

| | K CS (MPa) | K DoL (μm) | Na CS-30 (MPa) | Na CS (MPa) | Na DoL (μm) | Stored tensile stress (MPa) |
|---|---|---|---|---|---|---|
| Comp. ex. 3 | 750 | 4.4 | 170 | 216 | 120 | 20.27 |
| Comp. ex. 4 | 750 | 4.0 | 100 | 125 | 135 | 13.91 |
| Comp. ex. 5 | 820 | 7.6 | 130 | 163 | 123 | 18.01 |
| Example 6 | 775 | 7.1 | 175 | 221 | 125 | 22.70 |
| Comp. ex. 6 | 975 | 5.0 | 127 | 161 | 127 | 17.54 |
| Comp. ex. 7 | 680 | 125 | | | | 60.71 |

The following two tables show the values for the calculation of the stored tensile stress for the sake of better understanding of the calculation. "IP" stands for "intersection point" therein.

TABLE 3

Illustration of calculation of stored tensile stress of the glasses according to Table 1

| | IP K DoL | Na DoL − K DoL | IP Na DoL | (a + b)/2 | K Integral in MPa* μm | Na Integral in MPa*μm | Total integral in MPa*mm | Stored tensile stress (MPa) |
|---|---|---|---|---|---|---|---|---|
| Example 1 | 3.88 | 114.12 | 112.3 | 113.21 | 2094.75 | 13211.04 | 15.31 | 21.87 |
| Comp. ex. 1 | 4.60 | 117.40 | 115.5 | 116.45 | 2281.50 | 11888.38 | 14.17 | 20.24 |
| Comp. ex. 2 | 4.90 | 120.10 | 118.2 | 119.15 | 2424.20 | 11712.45 | 14.14 | 20.20 |
| Example 2 | 4.98 | 118.02 | 116.0 | 117.01 | 2523.50 | 12194.78 | 14.72 | 21.03 |
| Example 3 | 5.08 | 125.92 | 124.1 | 125.01 | 2494.35 | 11925.95 | 14.42 | 20.60 |
| Example 4 | 5.04 | 124.96 | 123.1 | 124.03 | 2515.05 | 12179.75 | 14.69 | 20.99 |
| Example 5 | 4.97 | 127.03 | 125.1 | 126.07 | 2539.20 | 12951.29 | 15.49 | 22.13 |
| Example 6 | 5.13 | 132.87 | 130.9 | 131.89 | 2680.25 | 13828.14 | 16.51 | 23.58 |

TABLE 4

Illustration of calculation of stored tensile stress of the glasses according to Table 2

| | IP K Dol | Na DoL − K DoL | IP Na DoL | (a + b)/2 | K Integral in MPa* μm | Na Integral in MPa* μm | Total integral in MPa*mm | Stored tensile stress (MPa) |
|---|---|---|---|---|---|---|---|---|
| Comp. ex. 3 | 3.10 | 116.90 | 115.6 | 116.25 | 1650.00 | 12537.56 | 14.19 | 20.27 |
| Comp. ex. 4 | 3.30 | 131.70 | 131.0 | 131.35 | 1500.00 | 8235.65 | 9.74 | 13.91 |
| Comp. ex. 5 | 6.08 | 116.92 | 115.4 | 116.16 | 3116.00 | 9490.27 | 12.61 | 18.01 |
| Example 6 | 5.07 | 119.93 | 117.9 | 118.92 | 2751.25 | 13140.11 | 15.89 | 22.70 |
| Comp. ex. 6 | 4.17 | 122.83 | 122.0 | 122.42 | 2437.50 | 9842.17 | 12.28 | 17.54 |
| Comp. ex. 7 | | | | | | | 42.50 | 60.71 |

The following Table 5 summarizes compositions of glasses according to the present disclosure. All data are given in percent by weight, as obtained from analyzes of glasses after melting and prior to chemical toughening.

TABLE 5

Composition of exemplary glasses

| Name | Example 1 | Example 2 | Example 3 | Example 4 | Example 5 | Example 6 |
|---|---|---|---|---|---|---|
| $SiO_2$ | 61.40 | 60.40 | 61.50 | 61.20 | 61.30 | 61.40 |
| $Al_2O_3$ | 18.20 | 18.00 | 18.30 | 18.70 | 18.70 | 18.70 |
| $B_2O_3$ | 0.58 | 0.55 | 0.55 | 0.28 | 0.27 | 0.10 |
| $Li_2O$ | 4.90 | 4.80 | 4.50 | 4.60 | 4.60 | 4.70 |
| $Na_2O$ | 8.80 | 8.10 | 8.80 | 8.80 | 9.10 | 9.10 |
| $K_2O$ | 0.84 | 1.60 | 0.90 | 0.84 | 0.47 | 0.50 |
| MgO | | | 0.52 | 0.53 | 0.53 | 0.5 |
| CaO | 0.51 | | 0.013 | 0.013 | 0.014 | — |
| ZnO | 0.53 | 1.24 | 0.19 | 0.19 | 0.19 | 0.20 |
| $P_2O_5$ | 0.58 | 1.58 | 1.03 | 1.04 | 1.04 | 1.03 |
| $Fe_2O_3$ | 0.036 | 0.034 | 0.034 | 0.033 | 0.032 | 0.032 |
| $ZrO_2$ | 3.53 | 3.47 | 3.60 | 3.61 | 3.63 | 3.60 |
| $CeO_2$ | 0.095 | 0.093 | 0.098 | 0.097 | 0.100 | 0.096 |
| $P_2O_5$ + $Na_2O$*ZnO | 5.244 | 11.624 | 2.702 | 2.712 | 2.769 | 2.850 |

Table 6 lists compositions of comparative glasses.

TABLE 6

Composition of comparative examples (C. ex.)

| Name | C. ex. 1 | C. ex. 2 | C. ex. 3 |
|---|---|---|---|
| $SiO_2$ | 60.70 | 60.60 | 62.00 |
| $Al_2O_3$ | 18.10 | 18.10 | 18.40 |
| $B_2O_3$ | 0.57 | 0.56 | 0.59 |
| $Li_2O$ | 4.90 | 4.70 | 4.80 |
| $Na_2O$ | 8.80 | 8.70 | 9.40 |
| $K_2O$ | 0.84 | 0.87 | 0.10 |
| MgO | — | — | — |
| CaO | 0.01 | — | 0.78 |
| SrO | — | — | 0.091 |
| ZnO | 1.24 | 1.24 | 0.08 |
| $P_2O_5$ | 1.14 | 1.60 | — |
| $Fe_2O_3$ | 0.036 | 0.037 | 0.037 |
| $ZrO_2$ | 3.48 | 3.47 | 3.56 |
| $CeO_2$ | 0.093 | 0.095 | 0.1 |
| $P_2O_5$ + $Na_2O$ * ZnO | 12.052 | 12.388 | 0.752 |

Table 7 shows the influence of chemical toughening for a glass article of optimized composition according to Example 6 of the present disclosure.

TABLE 7

Influence of toughening conditions on the strength values for an LAS glass article according to the present disclosure

| Exchange 1 | Exchange 2 | K CS (MPa) | K DoL (μm) | Na CS 30 (MPa) | Na CS (MPa) | Na DoL (μm) | Stored tensile stress (MPa) |
|---|---|---|---|---|---|---|---|
| 2.5 h 395° C. 50/50% | 3 h 380° C. 92/8% | 775 | 6 | 163 | 207.4 | 124 | 20.921 |
| 4 h 390° C. 50/50% | 3 h 380° C. 92/8% | 771 | 7.1 | 171 | 214.4 | 128 | 22.577 |
| 2 h 400° C. 50/50% | 3 h 380° C. 92/8% | 769 | 5.9 | 162 | 207.7 | 121 | 20.435 |
| 3 h 395° C. 70/30% | 3 h 380° C. 92/8% | 800 | 6.5 | 141 | 178.4 | 124 | 18.782 |
| 3 h 395° C. 50/50% | 2.5 h 380° C. 90/10% | 757 | 5.8 | 173 | 219.7 | 126 | 22.131 |
| 3 h 395° C. 50/50% | 4.5 h 380° C. 92/8% | 769 | 7.4 | 161 | 202.6 | 125 | 21.223 |
| 3 h 395° C. 50/50% | 3 h 360° C. 94/6% | 825 | 5.2 | 177 | 225.3 | 126 | 22.619 |
| 3 h 390° C. 40/60% | 4 h 370° C. 97.5/2.5% | 815 | 7 | 139 | 175.3 | 124 | 18.819 |

However, in addition to the other conditions, the achievable toughening also depends on the age of the exchange bath, in particular of the lithium content thereof. As will be apparent from Table 8 below, the stored tensile stress that is achievable decreases as the lithium content increases, and consequently decreases as the age of the exchange bath increases.

What seems to be decisive here for achieving a stored tensile stress, is in particular the nominal content of the exchange bath for the first ion exchange of more than at least 40 wt % of potassium salt (and accordingly less than at most 60 wt % of sodium salt) and of at most less than 70 wt % of potassium salt (and accordingly at least more than 30 wt % of sodium salt), as well as a temperature between at least 380° C. and less than 400° C., for example at most 395° C. Substitution processes in which these conditions were not met during the first ion exchange exhibited insufficient stored tensile stress and are given in italics in the Table 7 above.

TABLE 8

Influence of the lithium content of the exchange bath on the achievable stored tensile stress

| Lithium content of exchange bath | K CS (MPa) | K DoL (μm) | Na CS 30 (MPa) | Na CS (MPa) | Na DoL (μm) | Stored tensile stress (MPa) |
|---|---|---|---|---|---|---|
| 0%/0% w/w Li | 750 | 4.3 | 168 | 221 | 115 | 19.90 |
| 0.3%/0.3% w/w Li | 649 | 4.4 | 149 | 195 | 118 | 17.92 |
| 0.6%/0.6% w/w Li | 587 | 4.5 | 136 | 175 | 123 | 16.81 |
| 0.9%/0.9% w/w Li | 520 | 4.5 | 119 | 153 | 125 | 14.88 |
| 1.2%/1.2% w/w Li | 491 | 4.6 | 97 | 123 | 131 | 12.72 |
| 1.5%/1.5% w/w Li | 471 | 4.6 | 81 | 101 | 135 | 11.02 |

FIG. 1 is a graph showing stress, in MPa, plotted along the y-axis versus glass depth, in μm, plotted along the x-axis, and illustrating characteristic parameters of a stress profile for a glass article comprising an LAS glass, by way of an exemplary composite stress profile 1. In this case, the stress is not shown over the entire thickness of the glass article, rather the stress is only exemplified for about half of the glass article.

Here, point 101 denotes the stress existing on the surface of the glass article, i.e. at a glass depth of 0 μm. This is compressive stress caused by the potassium ion exchange (potassium CS). Point 102 denotes the compressive stress produced at the surface of the glass article by sodium ion exchange (also referred to as sodium CS). This is a value determined by extrapolation, since the stress profile caused by sodium ion exchange and the stress profile caused by potassium exchange overlap here. Point 103 shows the value of the compressive stress attributed to sodium ion exchange at a glass depth of 30 μm (sodium CS-30). At point 105, the stress in the glass article is 0. This is the so-called depth of compressive stress for sodium ions, also referred to as sodium DoL (or just DoL). 104 denotes the compressive stress integral caused by the exchange of sodium ions.

By extrapolation of that part of the preliminary stress profile 1, the depth of compressive stress for potassium (potassium DoL) is obtained, here designated 106.

107 indicates the region of the normalized tensile stress integral, that is the stored tensile stress. Finally, 108 indicates the "sodium CS intersection point", that is the compressive stress at the point of the compressive stress profile at which the sodium compressive stress curve and the potassium compressive stress curve intersect.

Figure 2:
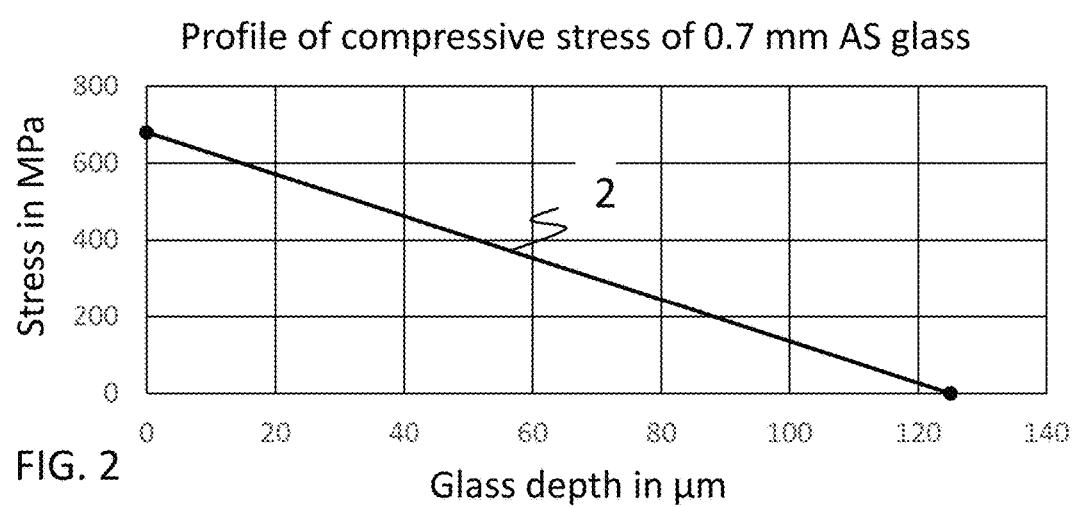

FIG. 2 schematically illustrates a stress profile 2, here in the form of a pure compressive stress profile, for a glass article having a thickness of 0.7 mm, which comprises an alkali silicate glass. Thus, high depth of compressive stress and high compressive stresses can also be achieved with such glasses. However, in comparison with composite compressive stress profiles as shown in FIG. 1 by way of example, a higher compressive stress integral is resulting, and accordingly also a higher tensile stress integral. This means that such toughened AS glasses exhibit low strength against sharp impact loads. The normalized tensile stress integral has a very high value of about 60.7 MPa.

FIG. 3 shows a stress profile 3 of a glass article comprising an LAS glass. So, the stress profile is a composite profile here. Although the depth of compressive stress and the compressive stress at the surface are comparable to that of the AS glass of FIG. 2, the compressive stress integral is significantly smaller here, namely only about one third of what is determined for the glass article according to FIG. 2. Here, 301 denotes the potassium integral of the stored compressive stress with a potassium CS value of 975 MPa and a potassium DoL of 5 μm. 302 denotes the sodium integral of the stored compressive stress with a sodium CS-30 of 127 μm and a sodium DoL of 127 μm. The sum of these two integrals gives the compressive stress integral, and the absolute value thereof corresponds to the tensile stress integral in the toughened glass.

The relationship is illustrated by the values of the so-called set drop test shown in FIG. 4, which were determined for the AS glass according to FIG. 2 and for the LAS glass according to FIG. 3. Despite almost the same compressive stress at the surface and almost the same depth of compressive stress, this test with sharp impact load reveals significant differences in the achieved strength. In particular, the strength determined under such loading is significantly higher for the toughened LAS glass article than the strength determined for the toughened AS glass article.

Figure 5:
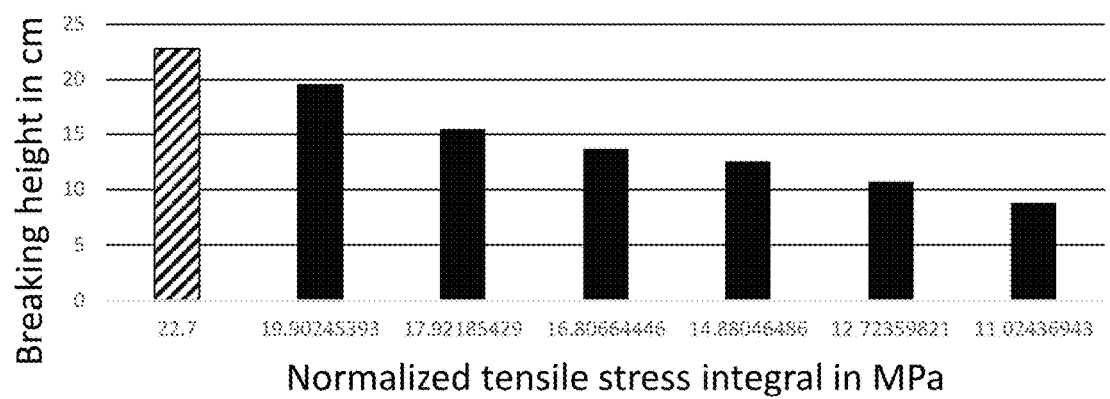
FIG. 5 is a graph illustrating the relationship between stored tensile stress and strength in the sandpaper ball drop test.
Figure 6:
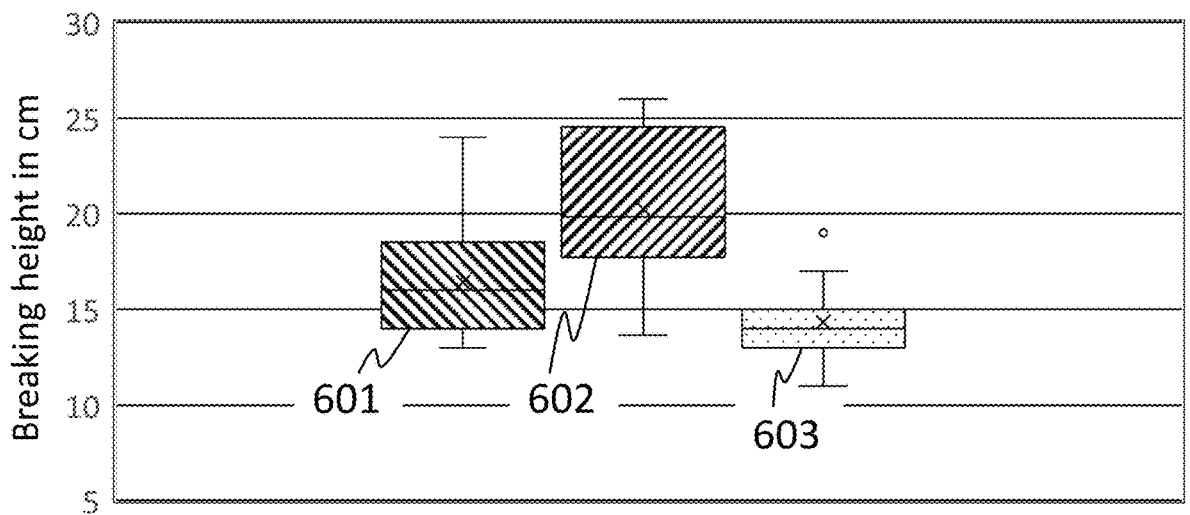
FIG. 6 is a graph of the strength of different glass articles in the sandpaper ball drop test.

The dependence of the strength determined in sandpaper ball drop tests as a function of the stored tensile stress is shown in FIG. 5. Stored tensile stresses below 20 MPa lead to poor test results, namely to breaking heights of less than 20 cm. The influence of the glass composition on the strength is shown in FIG. 6. Here, the strength obtained in the sandpaper ball drop test is plotted for glass articles comprising different LAS starting glasses. On the left in the chart, bar 601 shows the sandpaper ball drop strength for a chemically toughened glass article which comprises an LAS glass according to WO 2012/126394 A1, for example. On the right, bar 603 shows the sandpaper ball drop strength for another toughened glass article comprising another prior art LAS glass. In the center, bar 602 shows the sandpaper ball drop strength for a chemically toughened glass article according to the present disclosure. It exhibits optimized strength in the sandpaper ball drop test.

Figure 7:
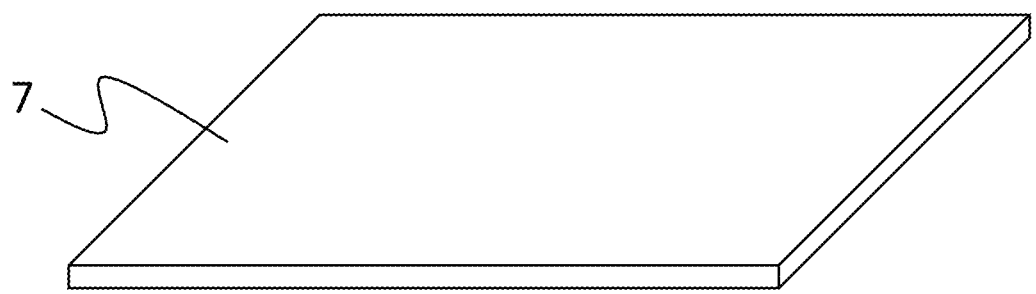
FIG. 7 is a schematic view, not drawn to scale, of a glass article according to the present disclosure.

FIG. 7 shows a sheet-like chemically toughened or chemically toughenable glass article 7 according to embodiments of the present disclosure.

Figure 8:
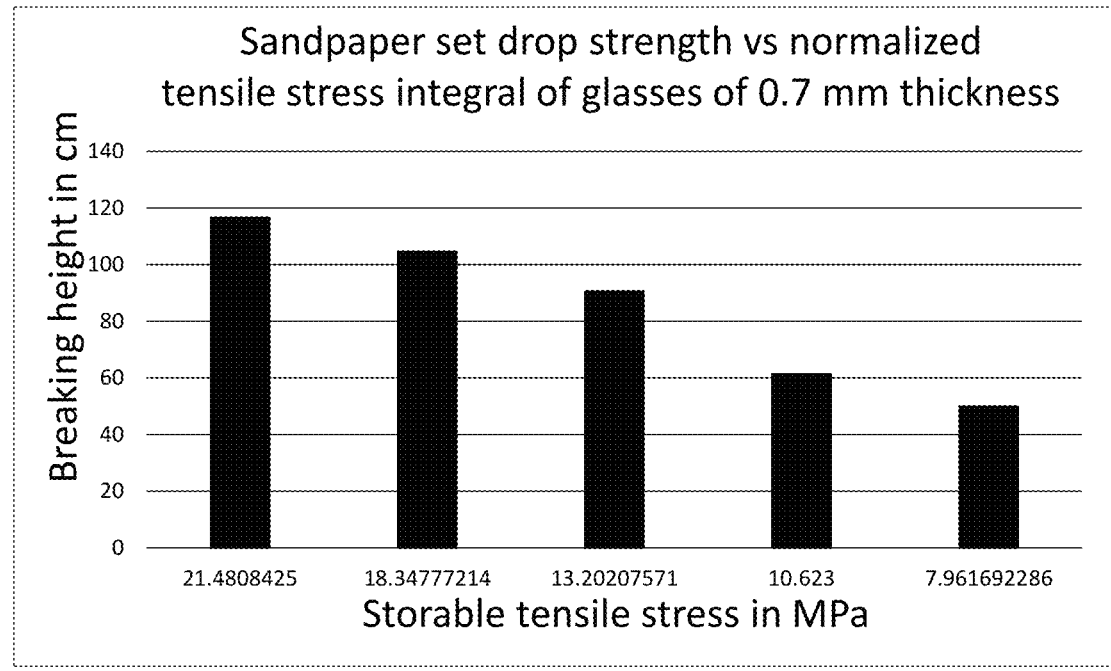
FIG. 8 illustrates the relationship between stored tensile stress and breaking height in the sandpaper ball drop test for a glass of 0.7 mm thickness.

FIG. 8 shows a diagram of the breaking height in the sandpaper set drop test as a function of the normalized tensile stress integral for glasses of 0.7 mm thickness. It can be clearly seen that the breaking heights increase, at least in the range of the tensile stresses presented here, accordingly, the greater the stored tensile stress the more the strength of the glass or glass article is increased and the more the resistance of the glass or glass article to such mechanical stress is enhanced.

LIST OF REFERENCE NUMERALS

Exemplary stress profile of a toughened LAS glass article
101 Surface of the glass article, potassium CS
102 Sodium CS
103 Sodium CS-30
104 Sodium compressive stress integral
105 Sodium DoL, depth of compressive stress for sodium ions
106 Depth of compressive stress for potassium ions, potassium DoL
107 Stored tensile stress, normalized tensile stress integral
108 Na CS/K DoL intersection point
2 Schematic stress profile of a toughened AS glass article
3 Stress profile of a toughened LAS glass article
301 Normalized potassium integral of compressive stress
302 Normalized sodium integral of compressive stress
303 Na CS/K DoL intersection point
7 Sheet-like chemically toughened or chemically toughenable glass article
401 Sandpaper set drop strength for AS glass
402 Sandpaper set drop strength for LAS glass
601 Sandpaper ball drop strength for prior art LAS glass
602 Sandpaper ball drop strength for LAS glass according to one embodiment
603 Sandpaper ball drop strength for a further prior art LAS glass

What is claimed is:

1. A chemically toughened sheet-like glass article, comprising:
    a thickness between at least 0.4 mm and at most 3 mm;
    a depth of compressive stress for potassium of at least 4 μm and at most 8 μm;
    a compressive stress at a depth of 30 μm due to sodium exchange of at most 200 MPa and a minimum amount selected from a group consisting of at least 90 MPa where the thickness is 0.5 mm, at least 100 MPa where the thickness is 0.55 mm, at least 110 MPa in where the thickness is 0.6 mm, at least 120 MPa where the thickness is 0.7 mm, and at least 140 MPa where the thickness is 1 mm;
    a ratio of sodium exchange depth, in μm, to the thickness, in mm, that is greater than 0.130; and
    a normalized integral of tensile stress that is a storable tensile stress of at least 20.6 MPa and at most 30 MPa.

2. The glass article of claim 1, wherein the normalized integral of tensile stress is at most 27.5 MPa.

3. The glass article of claim 1, wherein the normalized integral of tensile stress is at most 25 MPa.

4. The glass article of claim 1, wherein the normalized integral of tensile stress is at most 24 MPa.

5. The glass article of claim 1, comprising a glass composition, in wt %, of:
    $SiO_2$ 54 to 64;
    $Al_2O_3$ 16 to 28;
    $B_2O_3$ 0 to 0.6;
    $Li_2O$ 3.5 to 6.5;
    $Na_2O$ 3 to 11.1;
    $K_2O$ 0 to 1.5;
    MgO 0 to 2;
    CaO 0 to 0.55;
    ZnO 0 to 3;
    $P_2O_5$ 0.1 to 4.5;
    $ZrO_2$ 1 to 4.5, wherein
    $P_2O_5+(Na_2O*ZnO)$ is greater than 0.8 and less than 12.

6. The glass article of claim 5, wherein the glass composition comprises:
    $SiO_2$ 61 to 62;
    $Al_2O_3$ 18 to 19;
    $B_2O_3$ 0 to 0.1;
    $Li_2O$ 4.5 to 5.4;
    $Na_2O$ 7.8 to 10.5;
    $K_2O$ 0.3 to 0.75;
    MgO 0 to 1;
    CaO 0 to 0.1;
    ZnO 0 to 1;
    $P_2O_5$ 0.5 to 1.5; and
    $ZrO_2$ 2.9 to 4.1.

7. The glass article of claim 5, wherein the composition comprises up to 0.15 wt % of $CeO_2$ and/or up to 0.1 wt % of $Fe_2O_3$.

8. The glass article of claim 5, wherein the composition comprises SrO and BaO only in a form of unavoidable traces in a concentration of not more than 500 ppm.

9. The glass article of claim 1, wherein the glass article comprises a lithium aluminosilicate glass and wherein the compressive stress due to sodium exchange is due to a first ion exchange at a duration of 1.5 hours to 4 hours and a temperature between 380° C. and less than at most 400° C. in a first exchange bath composition comprising between at least 40 wt % and at most less than 70 wt % of potassium salt and at most 60 wt % to at least more than 30 wt % of sodium salt, and due to a second ion exchange at a duration of 2.5 hours to 5 hours and a temperature between 360° C. and 390° C. in a second exchange bath composition comprising between 90 wt % and 95 wt % of potassium salt and 10 wt % to 5 wt % of sodium salt.

10. The glass article of claim 9, wherein the potassium salt is $KNO_3$ and the sodium salt is $NaNO_3$.

11. The glass article of claim 1, further comprising a maximum tensile stress between 55 MPa and 85 MPa.

12. The glass article of claim 1, wherein the glass article is configured for a use selected from a group consisting of a cover sheet in a consumer electronic device, a protective glazing for machinery, a protective glazing for a high-speed train, a safety glazing, an automotive glazing, a diving watch, a submarine, and a cover sheet for explosion-proof equipment.

13. A glass comprising a composition, in wt %, of:
    $SiO_2$ 54 to 64;
    $Al_2O_3$ 16 to 28;
    $B_2O_3$ 0 to 0.6;
    $Li_2O$ 3.5 to 6.5;
    $Na_2O$ 3 to 11.1;
    $K_2O$ 0 to 1.5;
    MgO 0 to 2;
    CaO 0 to 0.55;
    ZnO 0 to 3;
    $P_2O_5$ 0.1 to 4.5;
    $ZrO_2$ 1 to 4.5, wherein
    $P_2O_5+(Na_2O*ZnO)$ is greater than 0.8 and less than 12.

14. The glass of claim 13, wherein the composition comprises:
    $SiO_2$ 61 to 62;
    $Al_2O_3$ 18 to 19;
    $B_2O_3$ 0 to 0.1;
    $Li_2O$ 4.5 to 5.4;
    $Na_2O$ 7.8 to 10.5;
    $K_2O$ 0.3 to 0.75;
    MgO 0 to 1;
    CaO 0 to 0.1;
    ZnO 0 to 1;
    $P_2O_5$ 0.5 to 1.5; and
    $ZrO_2$ 2.9 to 4.1.

15. The glass of claim 13, wherein the composition comprises up to 0.15 wt % of $CeO_2$ and/or up to 0.1 wt % of $Fe_2O_3$.

16. The glass of claim 13, wherein the composition comprises SrO and BaO only in a form of unavoidable traces in a concentration of not more than 500 ppm.

17. A method of producing a glass article, comprising:
exposing a lithium aluminosilicate glass to a first ion exchange at a duration of 1.5 hours to 4 hours and a temperature between 380° C. and less than at most 400° C. in a first exchange bath composition comprising between at least 40 wt % and at most less than 70 wt % of potassium salt and at most 60 wt % to at least more than 30 wt % of sodium salt; and exposing the lithium aluminosilicate glass to a second ion exchange at a duration of 2.5 hours to 5 hours and a temperature between 360° C. and 390° C. in a second exchange bath composition comprising between 90 wt % and 95 wt % of potassium salt and 10 wt % to 5 wt % of sodium salt.

18. The method of claim 17, further comprising providing, as the lithium aluminosilicate glass, a glass comprising a composition, in wt %, of:
$SiO_2$ 54 to 64;
$Al_2O_3$ 16 to 28;
$B_2O_3$ 0 to 0.6;
$Li_2O$ 3.5 to 6.5;
$Na_2O$ 3 to 11.1;
$K_2O$ 0 to 1.5;
$MgO$ 0 to 2;
$CaO$ 0 to 0.55;
$ZnO$ 0 to 3;
$P_2O_5$ 0.1 to 4.5;
$ZrO_2$ 1 to 4.5, wherein
$P_2O_5+(Na_2O*ZnO)$ is greater than 0.8 and less than 12.

19. The method of claim 18, wherein the composition comprises up to 0.15 wt % of $CeO_2$ and/or up to 0.1 wt % of $Fe_2O_3$.

20. The method of claim 18, wherein the composition comprises SrO and BaO only in a form of unavoidable traces in a concentration of not more than 500 ppm.

* * * * *